US010846450B2

(12) United States Patent
Elrabaa et al.

(10) Patent No.: US 10,846,450 B2
(45) Date of Patent: *Nov. 24, 2020

(54) DEVICE FOR SIMULATING MULTICORE PROCESSORS

(71) Applicant: KING FAHD UNIVERSITY OF PETROLEUM AND MINERALS, Dhahran (SA)

(72) Inventors: Muhammad Elnasir Elrabaa, Dhahran (SA); Ayman Ali Hroub, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 392 days.

This patent is subject to a terminal disclaimer.

(21) Appl. No.: 16/043,727

(22) Filed: Jul. 24, 2018

(65) Prior Publication Data

US 2019/0012417 A1 Jan. 10, 2019

Related U.S. Application Data

(63) Continuation of application No. 15/011,724, filed on Feb. 1, 2016, now Pat. No. 10,068,041.

(51) Int. Cl.
*G06F 30/33* (2020.01)
*G06F 13/12* (2006.01)
(Continued)

(52) U.S. Cl.
CPC .......... *G06F 30/33* (2020.01); *G06F 11/3636* (2013.01); *G06F 11/3648* (2013.01);
(Continued)

(58) Field of Classification Search
CPC ........ G06F 30/33; G06F 30/398; G06F 30/34; G06F 13/124; G06F 2115/10; G06F 11/3648; G06F 2119/12; G06F 11/3636
(Continued)

(56) References Cited

U.S. PATENT DOCUMENTS 5,943,490 A 8/1999 Sample
6,370,494 B1 4/2002 Mizuno et al.
(Continued)

OTHER PUBLICATIONS

Asif Khan, et al., "Fast and Cycle-Accurate Modeling of a Multicore Processor", IEEE International Symposium on Performance Analysis of Systems and Software (ISPASS), 2012, pp. 178-187.
(Continued)

*Primary Examiner* — Thai Q Phan
(74) *Attorney, Agent, or Firm* — Oblon, McClelland, Maier & Neustadt, L.L.P.

(57) ABSTRACT

Described herein are a processor and a method of operating the processor to simulate a many-core target machine. The processor includes a plurality of processing cores arranged in a predetermined manner and a global target clock counter (GTCC) configured to count a number of simulated clock cycles in the target machine. A global stall controller (GSC) configured to halt execution of all the processing cores based on a determination of at least one processing core being in a fault condition; and wherein the processor acquires a base clock per instruction (CPI) of a target machine, the CPI corresponding to an average number of clock cycles required by the target machine to execute a single instruction, translates an application of the target machine to a compact executable trace to be executed by the processor, and adjusts a speed of simulation by adjusting an update rate of the global target clock counter.

9 Claims, 12 Drawing Sheets

(51) Int. Cl.
    *G06F 11/36*     (2006.01)
    *G06F 115/10*    (2020.01)
    *G06F 119/12*    (2020.01)
(52) U.S. Cl.
    CPC ........ *G06F 13/124* (2013.01); *G06F 2115/10* (2020.01); *G06F 2119/12* (2020.01)
(58) Field of Classification Search
    USPC ....... 703/18, 19, 22, 24, 28; 714/27; 326/38, 326/40
    See application file for complete search history.

(56) References Cited

U.S. PATENT DOCUMENTS

| | | |
|---|---|---|
| 6,377,912 B1 | 4/2002 | Sample et al. |
| 6,446,249 B1 | 9/2002 | Wang et al. |
| 6,539,535 B2 | 3/2003 | Butts et al. |
| 6,557,116 B1 | 4/2003 | Swoboda et al. |
| 6,732,068 B2 | 5/2004 | Sample et al. |
| 7,089,170 B2 | 8/2006 | Buckmaster et al. |
| 8,010,334 B2 | 8/2011 | Bell et al. |
| 8,494,833 B2 | 7/2013 | Mejdrich |
| 8,898,642 B2 | 11/2014 | Beale et al. |
| 2002/0019969 A1* | 2/2002 | Hellestrand ............. G06F 9/455 716/102 |
| 2002/0161568 A1 | 10/2002 | Sample et al. |
| 2003/0074178 A1 | 4/2003 | Sample et al. |
| 2004/0267489 A1 | 12/2004 | Reblewski et al. |

OTHER PUBLICATIONS

Eric S. Chung, et al., "Protoflex: FPGA-acoelerated Hybrid Functional Simulator", IEEE International Parallel and Distributed Processing Symposium (IPDPS), 2007, pp. 1-6.

Michael Pellauer, et al., "HAsim: FPGA-Based High-Detail Multicore Simulation Using Time-Division Multiplexing", IEEE 17$^{th}$ International Symposium on High Performance Computer Architecture (HPCA), 2011, pp. 406-417.

Derek Chiou, et al., "FPGA-Accelerated Simulation Technologies (FAST), Fast, Full-System, Cycle-Accurate Simulators", 40$^{th}$ Annual IEEE/ACM International Symposium on Microarchitecture, Micro, 2007, pp. 1-13.

Zhangxi Tan, et al., "RAMP Gold: An FPGA-based Architecture Simulator for Multiprocessors", 47$^{the}$ ACM/IEEE Design Automation Conference (DAC), 2010, pp. 463-468.

* cited by examiner

DEVICE FOR SIMULATING MULTICORE PROCESSORS

CROSS-REFERENCE TO RELATED APPLICATIONS

The present application is a Continuation of Ser. No. 15/011,724, now allowed, having a filing date of Feb. 1, 2016.

FIELD OF INVENTION

The present disclosure relates generally to a multi-core compact executable trace (CET) processor that simulates other many-core processors in a seamless manner.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Chip multi processors (CMPs) or multi-core processors have lately gained considerable popularity and importance. The development of many-core processors has been identified as the only way to deliver high-performance computing as the chip manufacturing technology scales down to the NANO scale. These systems have huge potential in scientific computing. In order to design or program such systems, there are many design factors that designers have to explore, benchmarks that need to be executed, and performance statistics to be collected. When developing a many-core system, designers need to explore a huge design space, determine, the type and number of cores to be implemented, the memory specifications (hierarchy, sizes, and replacement policies), coherency protocols, interconnection networks and the like that.

Furthermore, application developers need to explore different machines and different algorithms to identify the best combination for their application. Experimenting on actual machines is a non-practical expensive option. Hence, simulation is used by both, hardware system designers/developers and application developers to explore the architectural space and/or the performance of certain algorithms on a specific architecture. Simulations involve building a model of the target many-core machine that is executed on a host machine. The model may be a pure software code that is executed on a general purpose computer, pure hardware that is built using Field-programmable gate arrays (FPGA), or a hybrid (software and hardware) model that runs on a computer and an FPGA simultaneously. Using simulation, hardware designers can verify the functionality of the target machine and assess its performance by running a set of standard software, called benchmarks. Alternatively, application developers can assess how their algorithms would run on different machines.

Current software simulators are very easy to use, but they lack accuracy and take very long time to simulate many-core computers with typical simulation speeds of few thousands instructions per second (i.e. it takes one second to run few thousands instructions of the target machine). Pure hardware simulators achieve better accuracy and speed (few million instructions per second) but they do this at the expense of much higher level of difficulty of usage. The hardware simulators require the users to be able to implement designs on FPGAs. Hybrid simulators are a compromise in terms of accuracy, speed and convenience to use.

Additionally, execution traces of an application have been used extensively in the past to capture an application's memory accesses, i.e. it represents a sequential list of all memory addresses that the application would access (read from/write to) for a certain input data set. The list can then be used to evaluate the execution time and behavior on a certain processor (including cache misses and hits). Such traces however, have a limited usage in evaluating the timing behavior of an application on a target many-core processor due to the absence of thread-spawning/termination, synchronization and coherency-related information in the traces. Coherency-related messaging between different memories in a many-core processor represents a large portion of an application's execution time. Another problem with the execution traces is their large sizes.

Accordingly, there is a requirement for a simulation method that is accurate and fast, yet easy to use. Specifically, there is a requirement to develop a technique that compacts execution traces while adding enough information to them, in order to capture time consuming events that take place during the execution of an application on a many-core processor. Additionally, there is a requirement to develop a model that can be configured to execute such compact traces on any many-core target processor and yields the timing behavior of the application on the target machine.

SUMMARY

The present disclosure provides for a many-core compact executable trace (CET) processor that simulates other many-core processors (i.e., dubbed target machine). The present disclosure also provides for a method to translate programs of the target (simulated) machine to a compact executable trace (CET) that is used with the CET processor. The method obtains baseline clocks-per-instructions (CPI) of the target machine that is used to simulate the target machine. Furthermore, the method models the interconnection network of a many-core processor system and dynamically adjusts the speed of simulating the many-core system such that both, simulation time and required resources are minimized.

According to one embodiment is provided a device for simulating a many-core target machine, the device comprises a processor including: a plurality of processing cores arranged in a predetermined manner; a global target clock counter (GTCC) configured to count a number of simulated clock cycles in the target machine; a global stall controller (GSC) configured to halt execution of all the processing cores based on a determination of at least one processing core being in a fault condition; and wherein the processor is configured to: acquire a base clock per instruction (CPI) of a target machine, the CPI corresponding to an average number of clock cycles required by the target machine to execute a single instruction, translate an application of the target machine to a compact executable trace to be executed by the processor, determine whether to query an off-chip memory based on detecting a cache miss event, determine whether to adjust a simulation speed based on receiving a control signal from a router, and adjust dynamically, a speed of simulation of the processor by adjusting an update rate of the global target clock counter.

According to another aspect of the present disclosure is provided a method for simulating a many-core target machine, the method being performed by a processor, the method includes the steps of: acquiring a base clock per instruction (CPI) of a target machine, the CPI corresponding to an average number of clock cycles required by the target machine to execute a single instruction, translating an application of the target machine to a compact executable trace to be executed by the processor, determining whether to query an off-chip memory based on detecting a cache miss event, determining, by the processor whether to adjust a simulation speed based on receiving a control signal from a router, and adjusting dynamically, by the processor, a speed of simulation by adjusting an update rate of a global target clock counter (GTCC).

According to another of the present disclosure is provided a non-transitory computer readable medium having stored thereon a program that when executed by a computer, causes the computer to execute a method of simulating a many-core target machine, the method includes: acquiring a base clock per instruction (CPI) of a target machine, the CPI corresponding to an average number of clock cycles required by the target machine to execute a single instruction, translating an application of the target machine to a compact executable trace to be executed by the processor, determining whether to query an off-chip memory based on detecting a cache miss event, determining, whether to adjust a simulation speed based on receiving a control signal from a router, and adjusting dynamically, a speed of simulation by adjusting an update rate of a global target clock counter (GTCC).

The foregoing paragraphs have been provided by way of general introduction, and are not intended to limit the scope of the following claims. The described embodiments together, with further advantages, will be best understood by reference to the following detailed description taken in conjunction with the accompanying drawings.

BRIEF DESCRIPTION OF THE DRAWINGS

Various embodiments of this disclosure that are provided as examples will be described in detail with reference to the following figures, wherein like numerals reference like elements, and wherein.

DETAILED DESCRIPTION OF EMBODIMENTS

Figure 1:
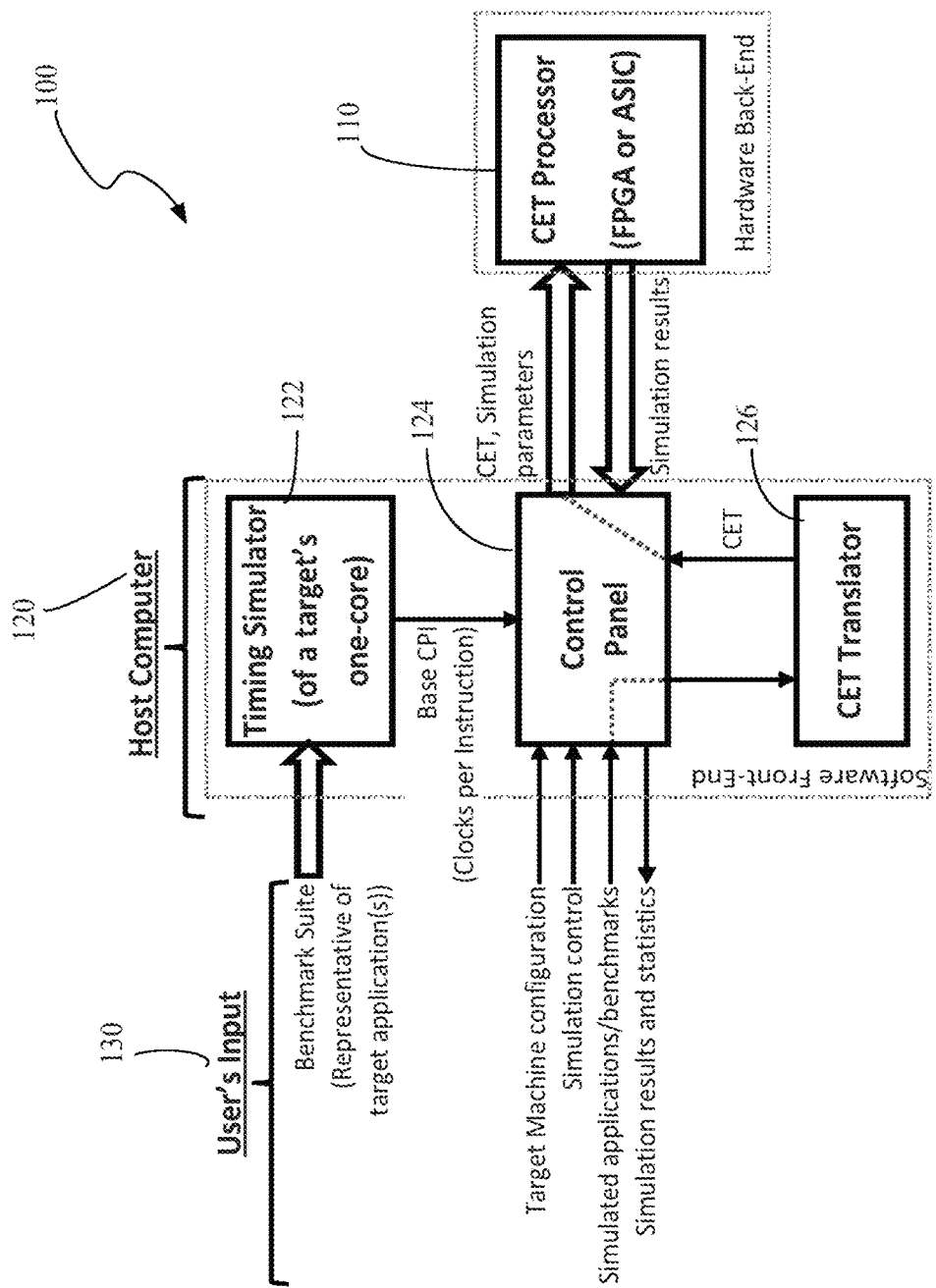
FIG. 1 depicts an exemplary block diagram illustrating a many-core simulation scheme based on a compact executable trace (CET) processor.

Exemplary embodiments are illustrated in the referenced Figures of the drawings. It is intended that the embodiments and Figures disclosed herein are to be considered illustrative rather than restrictive. No limitation on the scope of the technology and of the claims that follow is to be imputed to the examples shown in the drawings and discussed herein.

Turning to FIG. 1, is depicted according to an embodiment, an exemplary block diagram illustrating a many-core simulation scheme 100 based on a compact executable trace (CET) processor.

The simulation framework 100 includes a special purpose processor 110 that executes a compact executable trace (referred to herein as a CET processor) to accurately and efficiently simulate a timing behavior of an application on a many-core target processor. By one embodiment, the CET processor 110 can be implemented on an FPGA or as a standalone ASIC (application specific integrated circuit) with interfaces that provision communication with a host computer 120 that implements a software front-end.

The CET processor 110 obtains compact executable trace (CET), configuration parameters, and simulation control commands from the host computer 120 and uploads the simulation results and statistics to the host computer 120. The control panel 124 included in the host computer 120 is a graphical user interface of the CET processor 110 that provisions users to control the simulation of an application by performing at least one of: configuring the target machine by setting the architectural parameters, selecting benchmarks to be executed, invoking the CET-Translator 126 on the selected benchmark (performed once for a specific number of cores), invoking the one-core software timing simulator 122 on the selected benchmark (performed only once for a specific target core), downloading CET code/data on the CET processor 110, start/pause/terminate simulation, and interpreting the simulation results.

In what follows is described by one embodiment of the present disclosure, a technique of translating a target application to a compact executable trace (CET). In order to execute a target application on the CET processor 110, the base clocks per instruction (CPI) of the target machine for the application must be evaluated. Further, the target application may be translated into a CET instruction set architecture (ISA) to be executed by the processor 110. An instruction set, or instruction set architecture (ISA), is the part of the computer architecture related to programming, including the native data types, instructions, registers, addressing modes, memory architecture, interrupt and exception handling, and external I/O. By one embodiment, the base CPI of the target machine is evaluated once for the specific application and the specific target machine under consideration.

By one embodiment, the target machine's base CPI may be evaluated by using a representative set of benchmarks that are simulated using a model of the target machine's core (usually available as software simulators for commercial cores such as Intel x86 cores, MIPS, or ARM cores). The goal of the simulations is to determine the average number of clock cycles required to execute one instruction on the target machine in the ideal case i.e., the case wherein cache misses penalties are excluded. The base CPI is further injected to the CET processor at configuration time as a parameter. Thereafter, for each instruction, the CET processor adds the base CPI and the cache miss penalty (if any) to the simulated time.

The target application that is to be simulated on a specific many-core architecture using the CET processor should be translated into CET via the CET translator. The CET translator includes two phases: profiling and code and data generation.

In the profiling phase, the application is functionally executed using an emulator of the target machine. Such emulators (also called Instruction Set Architecture or ISA simulators/emulators) are readily available for commercially available processors. The profiling output is an image of the target application, wherein each instruction is represented as an object and contains all the data required for the timing simulation. The target application may be profiled in a dynamic manner taking one instruction at a time. When an instruction is encountered for the first time, a new object for the instruction is created and the object is mapped to a unique address in the profiled image. The mapping function can be a hash function that utilizes the instruction's address. Further, if the same instruction is encountered at a later stage in the profiling phase, the instruction's object is retrieved and modified as required.

Figure 2:
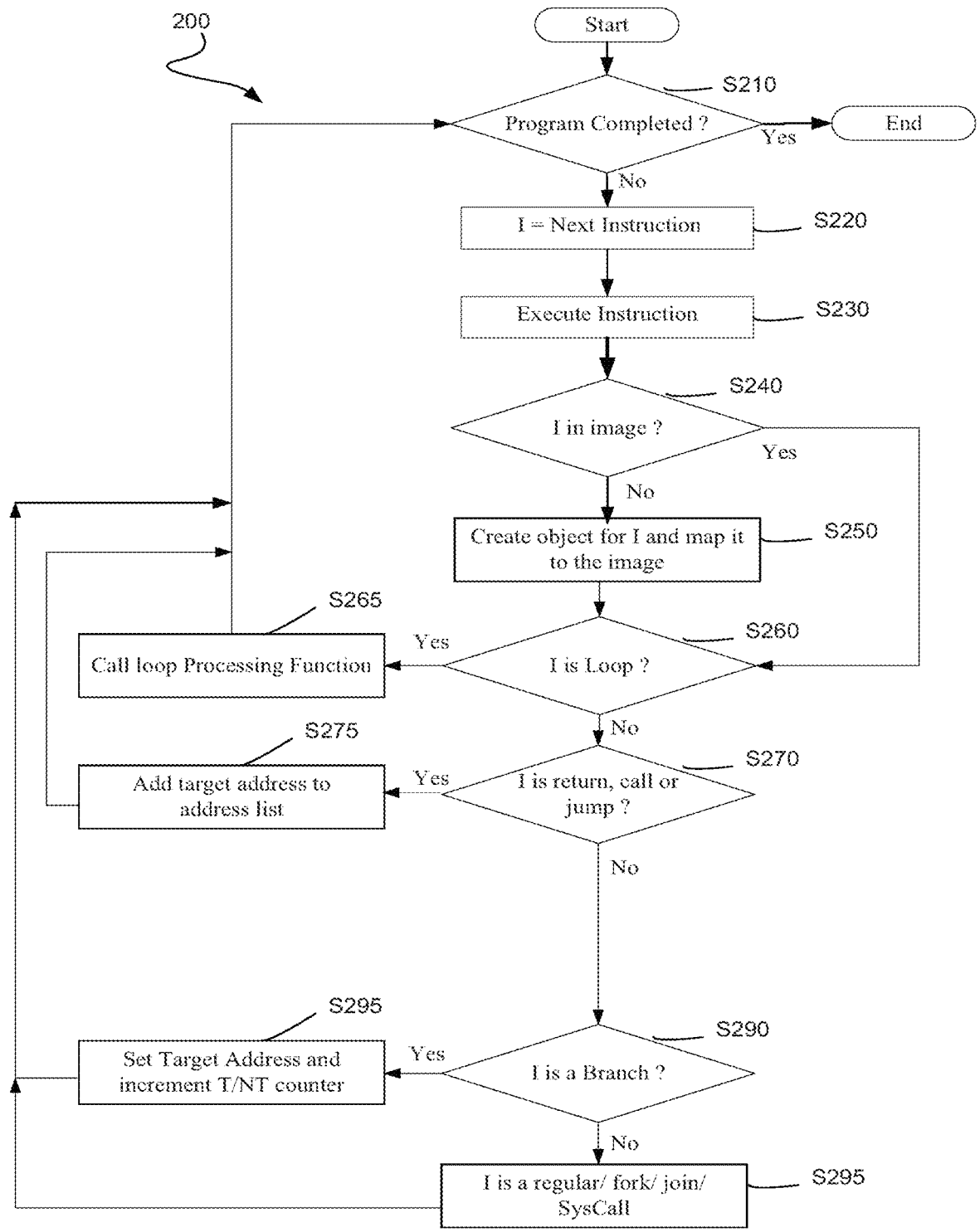
FIG. 2 illustrates according to an embodiment, an exemplary flowchart depicting the steps performed in CET profiling.

FIG. 2 illustrates according to an embodiment, an exemplary flowchart 200 depicting the steps performed in CET profiling phase. With regards to FIG. 2, it must be noted that the instruction object stores opcode, target address for branch instructions, list of addresses, and list of counters. The list of addresses includes all addresses associated with an instruction. In the case of a load/store type of instruction, the addresses correspond to the memory references of all data that is loaded/stored. In contrast, in the case of a return type instruction, the addresses correspond to the return addresses. It must be appreciated that the return type instruction can have multiple return addresses as a method may be called (i.e., initiated) from different points in the program. Additionally, the list of counters is associated with an inner loop. For each outer loop iteration, the inner loop includes a counter that corresponds to the number of iterations.

For sake of illustration, in FIG. 2, the parameter 'P' corresponds to the program that is to be profiled, the parameter 'T/NT' corresponds to the number of times a branch instruction is taken/not taken, and the parameter I corresponds to a particular instruction under consideration. The process 200 beings in step S210, wherein a query is made to determine if all the instructions in the program have been profiled. If the response to the query is affirmative, the process terminates. However, if the response to the query in step S210 is negative, the process proceeds to step S220, wherein the next instruction to the profiled is considered.

Further, in step S230, the instruction of step S220 is executed using an ISA emulator as stated previously. The process upon executing the instruction in step S230 performs a query in step S240 to determine whether the instruction exists in the profiled image. If the response to the query in step S240 is affirmative, the process proceeds to step S260, else if the response to the query in step S240 is negative, the process proceeds to step S250.

In step S250, a new instruction object in included in the profile image, for instance, by using a hash function of the address of the instruction. The process in step S260 makes a query to determine if the instruction under consideration is a loop type instruction. Specifically, the process determines whether the loop instruction is in a first iteration. If the response to the query is affirmative, the process proceeds to step S265, wherein a call to the loop processing function is made. Specifically, if the loop instruction is in the first iteration, a new counter (with an initial value of one) is added to a counters list. In contrast, if the loop instruction is at a stage after the first iteration, the value of the counter in the counter list is incremented. The processes upon profiling the loop function in step S265, loops back to step S210 to execute the next instruction.

If the response to the query in step S260 is negative, the process proceeds to step S270, wherein a query is made to determine whether the instruction under consideration is a return, call, or jump type instruction. If the response to the query is affirmative, the process proceeds to step S275, else if the response is negative, the process proceeds to step S290.

In step S275, upon determining the type of instruction to be a return, call or jump type instruction, the process adds the target address to the address list. Thereafter, the process loops back to step S210 to process the next instruction.

The process in step S270 makes a query to determine if the type of instruction under consideration is a jump type of instruction. Specifically, the process determines whether the type of instruction is an unconditional jump instruction. If the process determines that the instruction is in fact an unconditional jump instruction, the process proceeds to step S275, wherein the target address corresponding to the jump instruction is added to the address list. Additionally, if the instruction is determined to be a functional call type of instruction, the target address is set to the address of the called function.

If the response to the query in step S270 is negative, the process proceeds to step S290, wherein a query is made to determine whether the instruction is a branch type of instruction. Specifically, a query is made to determine a type of branch instruction. If the branch instruction is determined to be a taken-conditional branch instruction, the value of the parameter 'T' is incremented in step S295, and the branch target address is set in the object of the instruction. In contrast, if the type of branch instruction is determined to a branch instruction that is not taken, the value of the parameter 'NT' is incremented in step S295, where after the process loops back to step S210 to process the next instruction.

Further, if the response to the query in step S290 is determined to be negative, the process proceeds to step S295, wherein it is determined that the instruction I under consideration is a regular type instruction. The process thereafter loops back to step S210 to determine whether the program is completely profiled. If the response is negative, the process executes the next instruction. However, if the process determines that the program is completely profiled, the process terminates.

Figure 3:
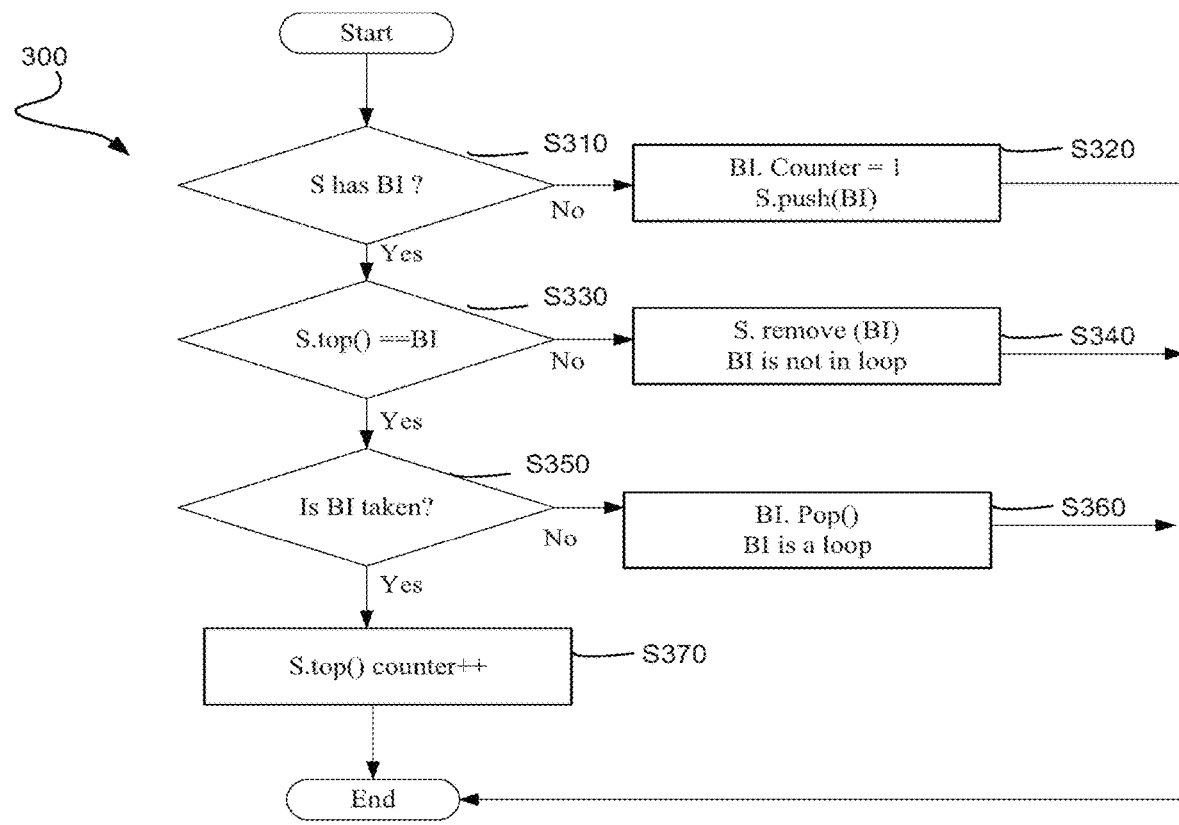
FIG. 3 depicts a flowchart illustrating the steps performed for processing branch instructions.

It must be appreciated that the profiling phase described above also implies loop instruction processing. In the original application, if the target ISA has no explicit loop instruction and the loop is not totally unrolled, the compiler translates loop constructs using backward conditional branches and counter registers. FIG. 3 depicts a flowchart 300 illustrating the steps performed for processing branch instructions. For the sake of illustration the parameter 'S' in FIG. 3 corresponds to a special stack and the parameter 'BI' corresponds to a branch instruction. In addition to the stack's push and pop functions, the stack S can be scanned to remove an element from the middle of the stack.

The process if FIG. 3 commences in step S310, wherein a query is made to determine if a branch instruction is encountered. If the response to the query in step S310 is affirmative the process proceeds to step S330, else if the response is negative, the process proceeds to step S320.

In step S320, since a branch instruction is not encountered, a stack push operation is performed, whereafter the process terminates. However, if a branch instruction is encountered in step S310, then the process in step S330 makes a query to determine whether the top element of the stack is the branch instruction. If the response to the query in step S330 is affirmative, the process moves to step S350, else if the response to the query is negative, then the process moves to step S340. In step S350, another query to determine whether the branch instruction is taken. If the response is affirmative, a taken counter is incremented (step S370).

However, if BI is the top of S (yes at step S330) and the branch instruction is not taken (no at step S350), then such a scenario corresponds to a last iteration of the loop instruction. Accordingly, a stack pop operation is executed and the instruction is marked as a loop instruction (step S360). Additionally, if BI exists on S and it is not the top element (no at step S330), the instruction is not a loop and it is removed from the S and marked as a regular branch instruction as shown in step S340.

Figure 4A:
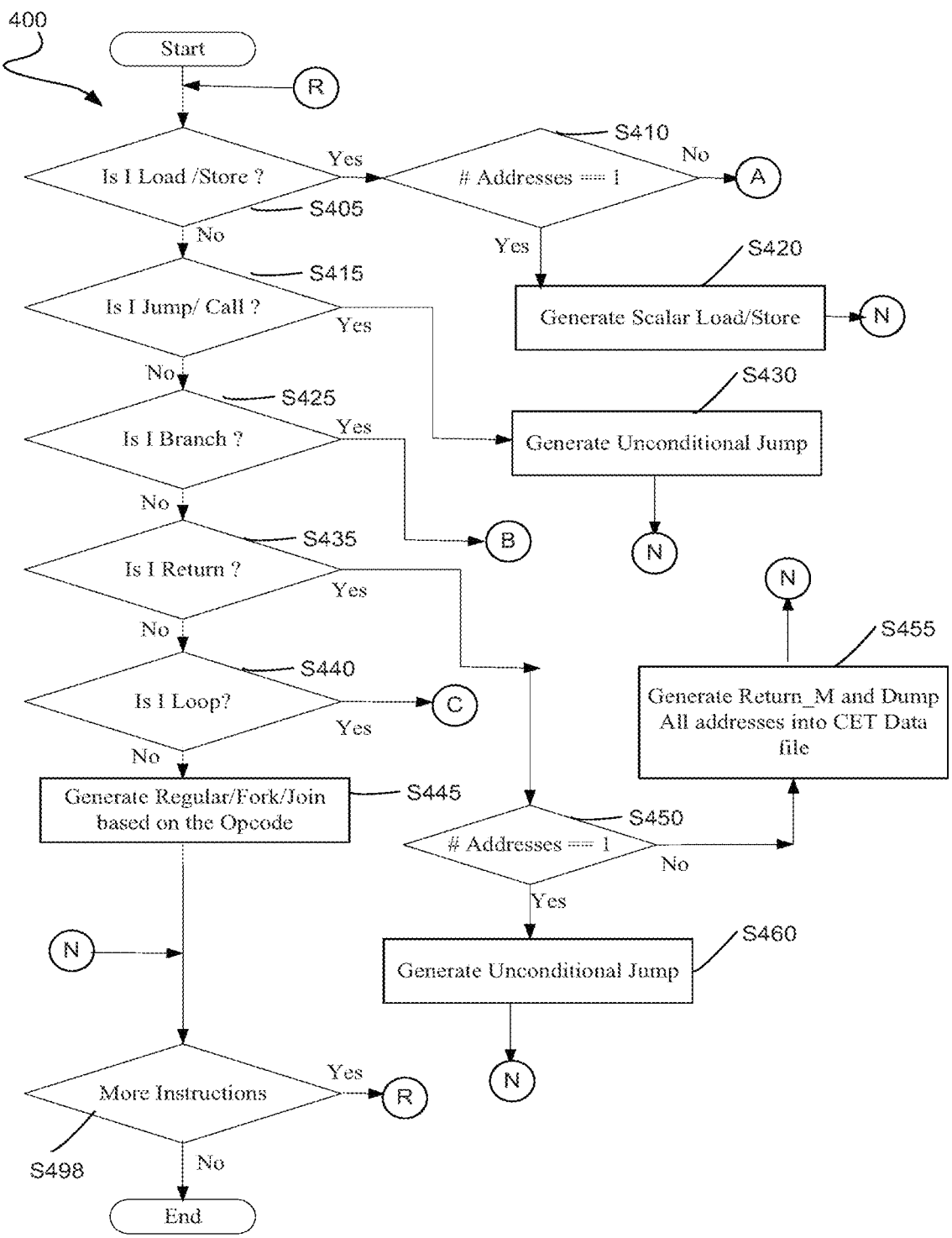
FIGS. 4A and 4B depict an exemplary flowchart illustrating the generation of CET code and data.
Figure 4B:
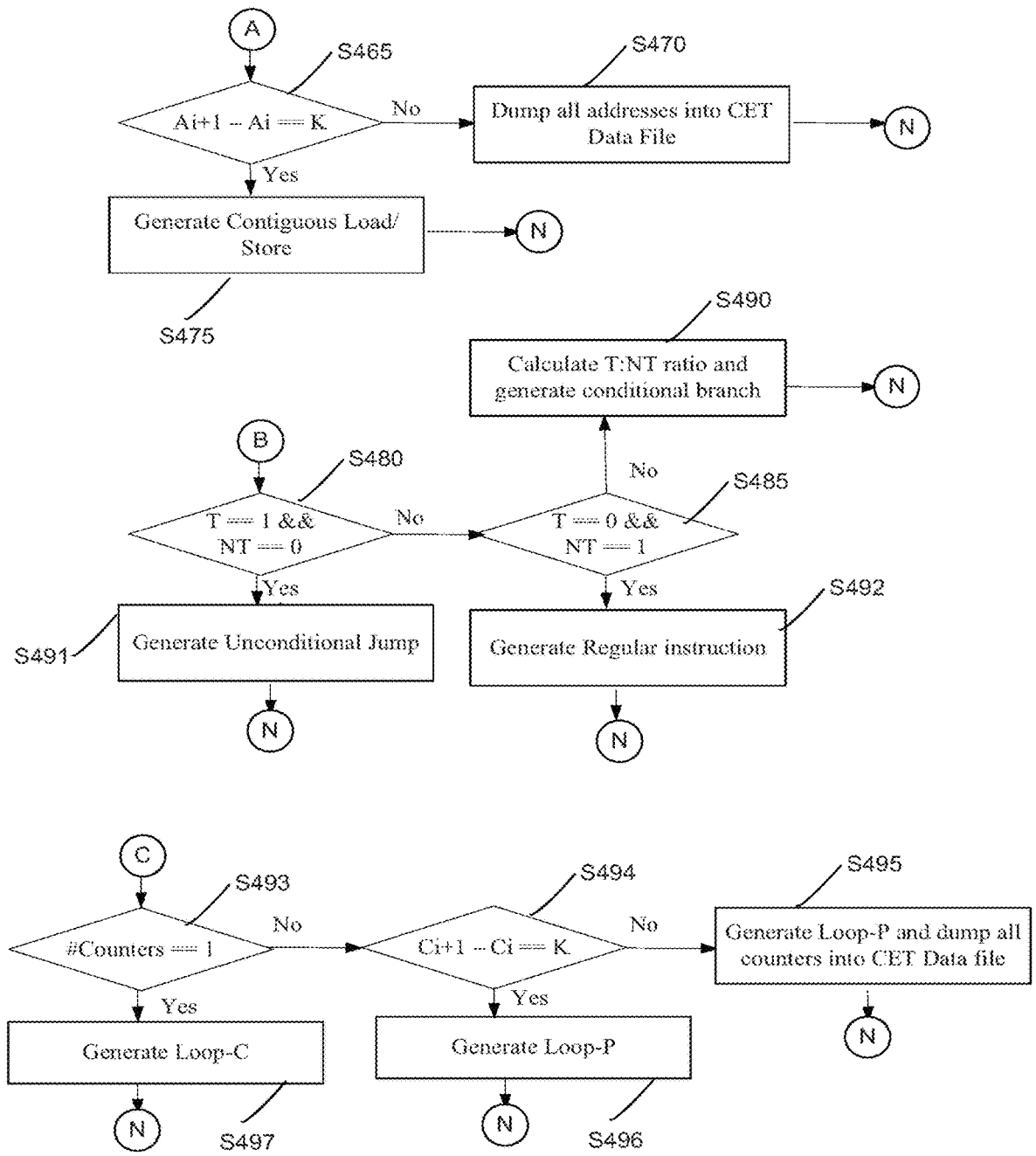

FIGS. 4A and 4B depict an exemplary flowchart illustrating the generation of CET code and data. Specifically, in the process as outlined in FIGS. 4A and 4B, the profiled image is refined and the instructions included therein are replaced by corresponding CET instructions. Moreover, control data is separated from CET code. Control data includes all the data that is required by the CET processor that cannot be embedded in CET instruction body directly, as one instruction may have a large amount of such data.

According to one embodiment, the control data may include: memory addresses of dynamic data structure elements, such as, the addresses of a linked list's elements; return addresses of a return instruction when it has multiple return addresses e.g., there is a procedure that is called from multiple points of the program; loop counters when the loop is an inner loop and it has a different counter per outer loop iteration, such as, an inner while loop and the like. In what follows, referring to FIGS. 4A and 4B is provided a detailed description of the process of generating CET code and data. Further, for the sake of illustration, we assume that the parameter 'code_file' and the parameter 'data_file' correspond to the output files for CET code and CET data, respectively. Also, the parameter 'data_index' (initially assigned to zero) corresponds to a pointer (index) in the CET data memory. Further, before translating the instructions of the target application to CET instructions, the instructions (and data) are converted into binary format. Additionally, the parameter 'd' corresponds to the displacement between the current jump or branch CET instruction and the target instruction in the profiled image. It must be appreciated that value of 'd' may be positive or negative based on the branch being a forward branch or a backward branch.

The process in 400 commences in step S405, wherein a query is made to determine whether the type of instruction under consideration is a load/store type of instruction. If the response to the query in step S405 is affirmative, the process moves to step S410, else if the response to the query in step S405 is negative, the process proceeds to step S415.

In step S410, the process makes a query to determine whether the number of addresses associated with the load/store instruction is one. If the response to the query of step S410 is affirmative, the process loads/stores the address by executing an instruction load/store address as shown in step S420, whereafter the process proceeds to step S498.

If the response to the query in step S410 is negative, the process in step S465 performs another query wherein a determination is made if the multiple addresses associated with the load/store instruction have a uniform displacement. If the response to the query in step S465 is affirmative, the contiguous set of addresses is loaded/stored with the execution of the instruction 'load-c/store-c address, increment'. If the response to the query in step S465 is negative, the process proceeds to step S470 wherein all addresses are dumped into the data_file. Such a process can be initiated with the execution of a command: 'Load-nc/store-nc data_index', wherein nc stands for non-contiguous. Additionally, the parameter data_index is incremented by the number of addresses loaded/stored. Furthermore, after the execution in each of the steps S470 and S475, the process loops back to step S498.

The process in step S415 makes another query to determine whether the type of instruction under consideration is a jump/call type instruction. If the response to the query in step S415 is affirmative, the process generates the unconditional jump by executing the instruction 'jump d', and thereafter proceeds to step S498.

If the response to the query in step S415 is negative, the process moves to step S425 and makes a query to determine whether the type of instruction under consideration is a branch type of instruction. If the response to the query in step S425 is affirmative, then the process proceeds to step S480 (FIG. 4B) and makes another query to determine if the conditional branch instruction is taken. Specifically, the process determines whether the values of the parameter T=1 and NT=0. If the response to the query in step S480 is affirmative, then the process in step S491 generates the unconditional jump instruction.

If the query in step S480 is negative, the process moves to step S485 wherein another query is made to determine the values of the parameter T and NT. Specifically, in step S485, a query is made to determine if T=0 and NT=1. If the response to the query is affirmative, the process in step S492 generates a regular instruction. If the response to the query in step S485 is affirmative, the process moves to step S490 wherein a ratio of the parameters T:NT is computes and a conditional branch instruction is generated. Note that upon the completion of the steps S490, S491, and S492, the process loops back to step S498.

Returning to step S425, if the response to the query therein is negative, the process moves to step S435 to determine whether the type of instruction under consideration is a return instruction. If the response to the query is affirmative, the process moves to step S450 to make another query as to determine whether the number of addresses associated with the branch instruction is one. If the response to the query in step S450 is affirmative, the process in step S460 generates an unconditional jump instruction. However, if the response in step S450 is negative, the process moves to step S455 wherein all the return addresses are dumped into the data_file, e.g., by executing the instruction 'return—m data_index'. Note that upon executing the instruction, the value f the parameter data_index is incremented by the number of return addresses.

The process in step S440 makes a query to determine whether the type of instruction under consideration is a loop type of instruction. If the response if affirmative, the process moves to step S493, else if the response is negative, the process moves to step S445. In step S493, the process determines whether the number of associated counters is one. If the response if affirmative the process moves to step S497, else the process proceeds to step S494. In step S494, the process determines whether the instruction includes a constant counter or not, based on which the process either generates a loop instruction (Step S496, or dumps the counters into the data_file. Specifically, if the counter is constant counter, the generated instruction can be: 'loop-c d, counter', else, if the instruction has multiple counters that follow a certain pattern i.e., it is an inner loop whose number of iterations increases by a fixed value for each new outer loop iteration, the generated instruction can be 'loop-p d, initial-counter, increment'. Furthermore, if the instruction has multiple random counters i.e., a while inner loop, the values of these counters are dumped into data_file and the generated instruction may be: 'loop-r d, data_index'. Note however, that the value of the parameter data_index is consequently increased by the number of the counters. Furthermore, upon execution of the tasks in steps S495, S496, and S497, the process oops back to step S498.

The process then proceeds to step S45 and generates an instruction such as regular, system call, fork instruction and join instruction. The process eventually proceeds to step S498 to determine whether more instruction are left for which the CET data is not yet processed. If the response to the query is affirmative, the process loops back to step S405 to re3peat the process for the next ion. However, if the response to the query in step S498 is negative, the process terminates.

Figure 5:
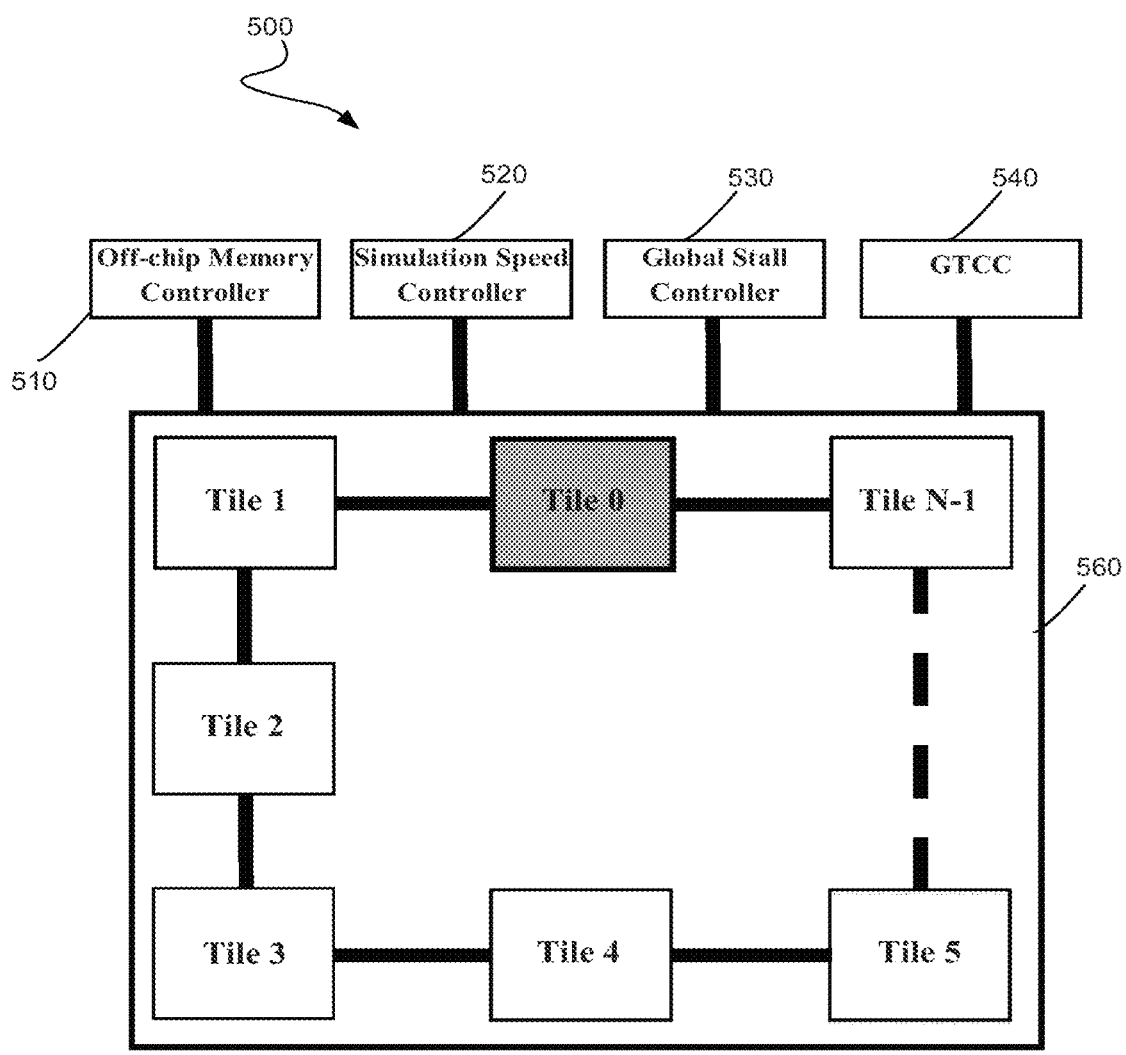
FIG. 5 depicts an exemplary CET processor according to one embodiment.

FIG. 5 depicts an exemplary CET processor 500 according to one embodiment. The CET processor is a special purpose timing simulation processor that can be configured to capture the timing characteristics of the target machine and further run benchmarks for performance evaluation. The CET processor can be used for architectural exploration of shared-memory multi-core processors as well as application simulations on such machines. Since input applications are translated apriori to specially-developed compact executable traces, the CET processor does not require functional units such as ALUs and furthermore does not need to store the whole input set of the benchmarks. This feature provides the CET processor the advantageous ability of significantly alleviating the hardware resources required to design the CET processor.

The CET processor decouples the target's clock (i.e., the clock of the many-core system being simulated) from the actual clock of the CET processor (also referred to herein as a host clock). Hence, a number of target cycles may take variable number of host cycles. The decoupling helps to minimize both the simulation time as well as the hardware resources that are required to implement the CET processor. For example, if an operation takes only one cycle in the target machine, the CET processor may simulate it in multiple cycles, but by utilizing fewer hardware resources. On the other hand, an operation may take several cycles in the target machine, but the CET processor can perform the operation in one cycle, thereby reducing the simulation time. Additionally, the CET processor has a Global Target Clock Counter (GTCC) that counts the number of simulated clock cycles in the target machine. The GTCC is also used to synchronize events by time stamping each event with a current value of GTCC. The GTCC is incremented in a dynamic rate so as to achieve the maximum possible simulation speed.

As shown in FIG. 5, the CET processor 500 includes a tiled architecture 560 that includes a plurality of tiles (labeled Tile 0 to Tile N-1) which are interconnected via a ring interconnection network (Network on Chip (NoC)). Each tile models a target machine's processing core, cache hierarchy, NoC router as well as memory required to store the CET code and data. By one embodiment, Tile 0 includes a master core which executes a master thread that contains the sequential and parallel regions of the target's program. The remaining tiles are referred to worker cores that are responsible for executing the worker threads i.e., the parallel regions of the application program. Further, the CET processor is able to simulate a target multi-core machine by using a number of cores less than or equals to those included in the CET processor without using a time-multiplexing approach.

Referring to FIG. 5, the CET processor 500 includes an off-chip memory controller 510 which is responsible for acquiring data and code frames from the off-chip memory to the on-chip caches in the case of a cache miss and further writing data and code frames back to the off-chip memory in the case of replacement. Additionally, the CET processor 500 includes the GTCC (Global Target Clock Counter) 540, which is the global clock of the target machine. The GTCC counts the number of simulated clock cycles in the target machine. The GTCC may also used to synchronize events by time stamping the events with the current value of GTCC. Additionally, as stated previously, the GTCC may be incremented in a dynamic rate to achieve the maximum possible simulation speed.

The CET processor 500 further includes a global stall controller (GSC) 530. Global stall is required when one of the host cores can't proceed due a frame fault. In this case, all CET cores must stall until that core recovers from the frame fault. When GSC module receives a frame fault signal from any CET core, it sets the global stall signals in all CET cores. After that core recovers from the frame fault, the core notifies the GSC module 530 which resets the global stall signal in all CET cores and then proceeds with the execution of the application program. The CET processor 500 also includes a simulation speed controller (SSC) 520. The SSC 520 is responsible for dynamically controlling the simulation speed while maintaining accuracy and coherency between different components of the CET processor. The objective of the SSC 520 is to maximize the simulation speed while maintaining accuracy.

By one embodiment, the CET processor 500 can be configured to simulate a specific target machine by selecting values for the following parameters: (a) number of cores (tiles) in the CET processor. The number of tiles in the CET processor itself is set during its implementation (either during FPGA configuration or ASIC design), (b) the NoC topology (Mesh, Ring, or Torus), (c) the cache coherence protocol (MSI, MOSI, MESI, MOESI, or MESIF) where M: Modified, S: Shared, I: Invalid, O: Owned, E: Exclusive and F: Forward, (d) the cache hierarchy depth (1 to 3 levels), (e) cache hierarchy (inclusive, exclusive or non-inclusive), (f) cache replacement policy in each cache level (FIFO: First in First out, LRU: Least Recently Used, LFU: Least Frequently Used, or Random), (g) size and associativity of each cache level, and (h) the last level cache (i.e., shared or private).

In what follows is provided a detailed description of the CET instruction set. In order to evaluate the performance of the target machine, the benchmarks have to be translated into CET. CET instructions are mainly control and memory instructions. Other instructions in the benchmark that neither affect the flow control, nor result into cache misses are translated into a regular instruction whose latency is the base average CPI.

A regular CET instruction is any instruction that doesn't affect the execution flow as well as it doesn't result in any miss event. These instructions have a fixed latency which is the base CPI. When a regular instruction is encountered, the CET core only increments the simulation time by the base CPI.

A fork instruction is an instruction that appears only in the master thread and it marks the beginning of a parallel region. The fork instruction does not incur any overhead on the target architecture. When it is encountered by the master thread, the instruction activates all of the worker cores to start the next parallel region.

A join instruction is an instruction that has no overhead on the target architecture. The join instruction marks the end of a parallel region. When such an instruction is encountered by a worker core, the worker core stalls and sends a join signal to the master core. On the other hand, when the instruction is encountered by the master core, it stalls the execution pipeline and waits for all worker cores to join. The execution of the jump instruction can be implemented by a counter, wherein the counter is incremented each time a join signal is received until the counter value becomes N−1 where N is the number of cores. Thereafter, the counter is reset and the master core resumes execution.

An unconditional jump instruction is a type of instruction that transfers the execution control to the target address which is calculated according to the equation (1). In equation (1), the parameter D is the displacement value between the jump instruction and its target.

$$PC=PC+D \quad (1)$$

The following instructions from the original target application are translated into the unconditional jump instruction: (a) unconditional jump, (b) call instruction, (c) return instruction, and (d) conditional branch when it is executed only once and it the branch is taken.

A conditional branch instruction is a type of CET instruction that transfers the execution control to a target address if a certain condition is met (i.e. when the branch is taken). If the condition is false, the branch is not taken i.e. the execution control doesn't jump to the target address.

The conditional branch instruction is a CET instruction that is used to approximate the conditional branch instruction in the original benchmark when it comes inside a loop body i.e., it is taken for some loop iterations and not taken in the others. Conditional branch instruction cannot be resolved at runtime by CET processor, because the CET processor does not functionally execute the original program. Therefore, an approximation is utilized. The approximation implies that the CET branch instruction includes a ratio between the number of loop iterations in which the branch is taken to the number of loop iterations in which the branch is not taken (T:NT). In the CET processor, the branch is taken for T consecutive loop iterations and not taken for NT consecutive loop iterations and so on. Therefore, the machine format of the CET conditional branch instruction can be expressed as: branch displacement, T, NT, direction, wherein branch displacement corresponds to the distance between the branch instruction and the target, and direction refers to the branch direction i.e., either forward or backward.

Another type of CET instruction is a return to multiple address instruction, also referred to herein as a return-m instruction. Return-m implies that a certain function is called from different points of the program and therefore it has multiple return addresses. The return addresses are collected by the CET-Translator tool and they are stored in the CET memory. Each time the return-m instruction is encountered, the next return address is fetched from the CET data cache and the PC is set to that return address.

Furthermore, another CET instruction is a break after instruction. The break instruction is used to substitute recursive constructs in which a conditional branch is taken after n−1 times. e.g., consider the following recursive function (used to compute a factorial of a number n, wherein the if condition is satisfied after n−1 function calls.

TABLE I code snippet demonstrating break instruction.

```
int function (int n)
{
    if (n <= 1)
        return 1;
    else
        return n * function(n-1)
}
```

Another type of CET instruction is a load/store instruction. Supporting load/store instructions is important to simulate the performance of the cache hierarchy of the target architecture. For each load/store instruction, CET processor checks if the instruction results in a cache hit or miss. In the case of cache miss, the miss penalty is added to the simulated time. According to one embodiment, the CET ISA has three types of load/store instructions: (1) scalar load/store instruction, wherein the load/store instruction doesn't occur inside a loop body. This type of instruction accesses only one memory location. The address of this location is embedded into the instruction body, (2) contiguous load/store (also referred to as a load/store-C) instruction, which accesses the elements of a contiguous block of data in memory within a loop, such as an array of elements. The address of the contiguous block is represented by the base address, which is the address of the first element of this block and the displacement which is the element size in bytes. The two address components (base address and displacement) are embedded into the instruction body. Each time the instruction is encountered, the base address is incremented by the displacement value and it is written back to CET instruction cache, and (3) noncontiguous load/store (also referred to herein as load/store-NC), wherein the instruction accesses elements of a non-contiguous data block in memory such as dynamic data structures. The addresses of this block's elements don't follow a certain pattern. Thus, the addresses are collected by CET-Translator tool and stored in CET memory. Every time this instruction is encountered, the address of the next element is fetched from the CET data cache before it is sent to the cache hierarchy to check for hit/miss.

According to one embodiment, the CET instruction set also includes a loop type instruction. The CET processor has three types of loop instructions: (1) loop-C, (2) a loop-P and (3) a loop-R type of instruction. The loop-C instruction has a constant counter value which is embedded in the instruction body as shown by the following example:

```
for(int i = 0; i < n; i++) // loop-C
    for(int j = 0; j < m; j++) // loop-C
```

The loop-P instruction is an inner loop instruction which comes in the body of an outer loop. In any outer loop iteration, the inner loop counter is different from the counter value in the previous iteration by a constant value. The initial value of the counter and the constant increment are embedded into the loop instruction body. For example:

```
for(int i = 0; i < n; i++)//loop-C
    for(int j = 0; j < i; j++)//loop-P
```

Furthermore, the loop-R is also an inner loop whose counter takes a different value per outer loop iteration without a constant difference between the counter values across outer loop iterations. The counter values of this loop are stored in the CET data memory. For each outer loop iteration, the next counter of loop-R is fetched from the CET data cache. For example as shown in the code segment below:

```
for(int i = 0; i < n; i++)//loop-C
    while(conditional Expression)//loop-R
```

Figure 6:
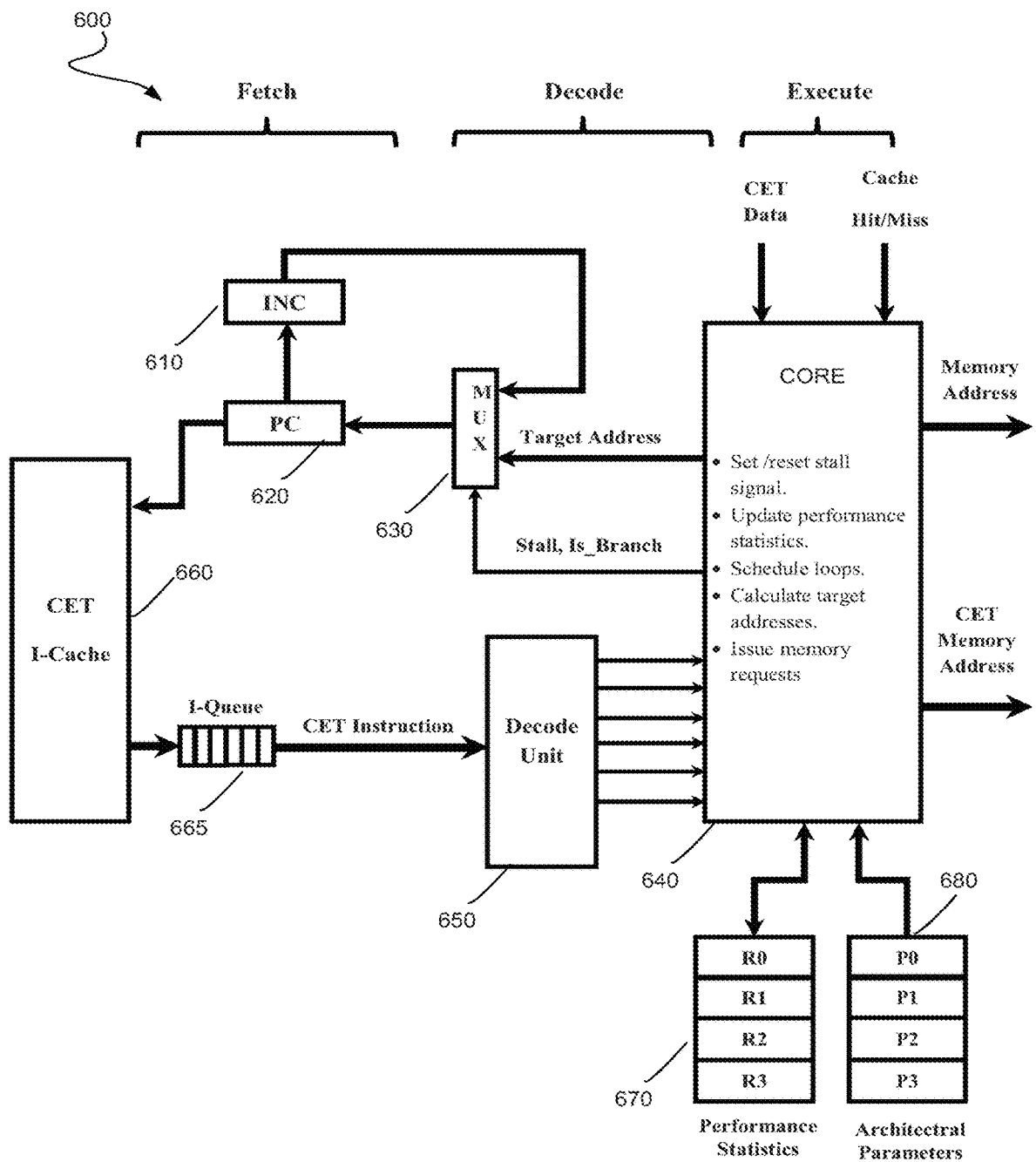
FIG. 6 illustrates an exemplary block diagram of a CET tile of FIG. 5.

Turning now to FIG. 6 is illustrated an exemplary block diagram 600 of a CET tile of FIG. 5. The CET tile 600 includes a CET core 640, a CET instruction cache 660, an instruction queue 665, a decode module 650, a program counter 620, a multiplexer 630, performance statistic register 670, architectural parameter register 680.

The CET core 640 is a single-threaded processing module that can simulate a multi-threaded target core. Multithreading of the target core is reflected into its base CPI. For example, if the target core is a 4-way SMT (Simultaneous Multithreaded) core and each line has a CPI of one, then the whole target core has a CPI of 0.25. Note that this corresponds to an ideal CPI, whereas the actual CPI is obtained through simulation as explained previously.

The CET core 640 executes the CET code in order to evaluate the performance of the target machine. As shown in FIG. 6, the CET core 640 has an execution pipeline of three stages: fetch stage, decode stage, and an execute stage. The fetch stage retrieves the next instruction from the CET instruction cache 660 into the core's instruction queue 665. Thereafter the instruction is fed to a decoder 650 and passed to the core 640 for evaluation. It must be appreciated that if the CET instruction is not found in the CET instruction cache 660, the whole CET processor stalls until this miss is resolved.

Furthermore, note that the execution in the CET core 640 is different from the execution in regular processors. Specifically, in the CET processor, the execution corresponds to tracking a pre-executed program, in order to evaluate how long (in terms of number of clock cycles) it will take the target machine to execute a program. Therefore, the execution stage performs the following functions: updating the performance counters, sending memory requests in case of load/store, updating the program counter (PC) in the case of control instructions and start/end parallel regions in the case of fork/join instructions.

Figure 7:
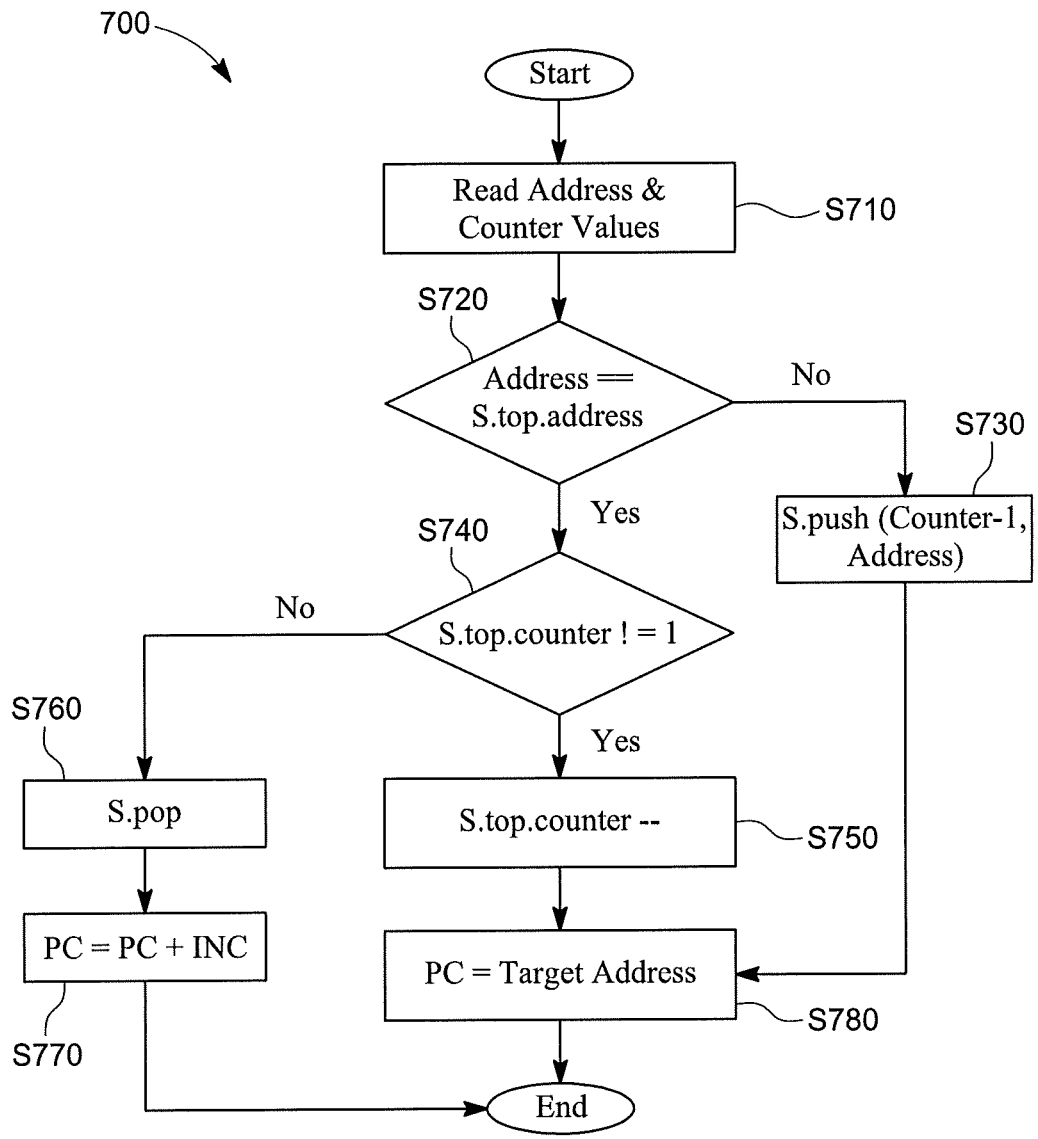
FIG. 7 illustrates a flowchart depicting the steps performed by a loop scheduling unit.

Turning now to FIG. 7 is illustrated a flowchart 700 depicting the steps performed by a loop scheduling unit of the CET processor. Note that although the loop counter value might be embedded in the instruction body, it cannot be decremented in the instruction body at runtime, as the initial value of the loop counter might be reused later in the case it is an inner loop.

According to one embodiment of the present disclosure, performance statistics are the performance numbers of the target machine generated by the CET processor. The CET processor stores these numbers into registers and updates them during timing simulation. They include the following: (1) number of read and write cache misses per cache level per core, and (2) the expected execution time of the application on the target machine broken down into its different components, such as, computation time, instruction cache miss penalty, data cache miss penalty (this component is further broken down into total L1 data cache miss time, total L1 instruction cache miss time, total L2 cache miss time, etc.), communication time which is the time spent in communicating messages among the different cores, and synchronization time which includes the waiting time due to synchronization primitives such as barriers and locks. By one embodiment, architectural parameters are a set of parameters that are used to describe the target machine. The user creates a new target architecture configuration by changing the values of one or more of these architectural parameters. The following Table II lists the different architectural parameters used in CET processor with a brief description:

TABLE II

Architectural parameters used in CET

| Parameter Name | Default Value | Notes |
| --- | --- | --- |
| Number of sockets | 2 | |
| Cores per socket | 8 | |
| Threads per core | 4 | Number of threads that are scheduled on one core. |
| L1 instruction cache latency | 3 cycles for data access, 1 cycle for tag access | |
| L1 data cache latency | 3 cycles for data access, 1 cycle for tag access | |
| L2 cache latency | 13 cycles for data access, 3 cycle for tag access | |
| L3 cache latency | 38 cycles for data access, 12 cycle for tag access | |
| Main memory latency | 175 cycles | |
| Reorder buffer size | 96 | |
| NoC topology | Ring | Ring or mesh. |
| Cache coherence protocol | MSI | It can be MSI, MESI, or MOESI, where M: Modified, S: Shared, I: Invalid, E: Exclusive, O: Owned. |
| Cache hierarchy | inclusive | It can be inclusive, exclusive, or not inclusive. |
| Cache line size | 64 Bytes | |
| L1 I-cache size | 32 KB per core | |
| L1 D-cache size | 32 KB per core | |
| L2 cache size | 256 KB per core | |
| L3 cache size | 20 MB per socket | |
| L1 instruction cache associativity | 8 | Cache associativity means the number of cache blocks or cache lines per one cache set. As it is known, the cache memory is divided into sets and each set comprises one or more cache blocks |
| L1 data cache associativity | 8 | |
| L2 cache associativity | 8 | |
| L3 cache associativity | 20 | |
| Base-CPI | 0.5 clocks per instruction | |
| Hop Latency | 2 cycles | The latency of passing through one hop on the NoC. The hop can be any stop on the NoC, such as, cache module, directory module, core, router, QPI interface, etc. |
| CPU frequency | 1.2 GHz | It is used to convert from clock cycles to seconds. |

By one embodiment, time division multiplexing technique can be employed wherein a single FPGA-based simulator component is timely multiplexed among multiple target architectural components. For instance, a single core model is timely multiplexed among multiple target cores using a certain scheduling algorithm, such as round robin. Time division multiplexing in this context is also known as host multi-threading, i.e., a host machine (FPGA in this context) can support multiple simulation threads such that each thread is responsible for a target core. In host multithreading, there is a single core model for multiple target cores whose architectural states are replicated. Furthermore, the decode unit as stated previously, may according to one embodiment, be a unit that receives a CET instruction and breaks it into its different fields, such as, opcode, address, counter, increment, etc.

Further, in the case of a loop-R, the counter value is not embedded in the instruction body because there is no single counter value. Accordingly, a stack is used to implement the loop nests. Such a stack is referred to herein as a loop stack (S).

The process as depicted in FIG. 7 commences in step S710 wherein the address of the loop instruction and a value of the counter are acquired by the CET. In step S720, a query is made to determine whether the loop instruction is encountered at the top of the stack. Is the response to the query is negative, the process proceeds to step S730, else the process proceeds to step S740 (affirmative response at S720). In step S730, when the loop instruction is not on the top of the stack, an entry of its counter (value being decremented by 1) and target address are pushed on the loop stack. Thereafter, the process proceeds to step S780.

However, if the loop instruction is on the top of the stack, the process in step S740 performs another query to determine whether the value of the counter is greater than one. If the response is affirmative, the process proceeds to step S750, wherein the value of the counter is decremented and further in step S780, the value of the program counter is set to the target address of the loop block i.e. the address of the first instruction in the loop body.

In contrast, if the response to the query in step S740 is negative, the process moves to step S760, wherein the loop stack is popped and the PC is updated to the address of the instruction right after the loop instruction (step S770), whereafter the process in FIG. 7 terminates. It must be appreciated that the process as depicted in FIG. 7 is invoked each time a loop instruction is encountered, i.e., for each loop iteration.

According to one embodiment, the CET processor as described in the present disclosure is a memory-based system. The code and data are stored in an off-chip memory. A portion of the memory is cached. The CET cache is organized into units called banks. Each bank stores one data frame. Each tile includes a CET data cache which caches a few data frames, and further includes a CET instruction cache, which caches a few code frames. When a CET core accesses a memory location that is not cached, a frame fault occurs. In this case, the request is forwarded to the off-chip memory controller.

Control data is consumed sequentially. Therefore prefetching control data frames is straight forward. Once a frame is consumed, its physical bank is filled with the next frame. On the other hand, CET code contains branch instructions which may skip the next frame(s) or transfer the control backward. To pre-fetch CET instruction frames, the instructions are pre-decoded while being loaded. If there is a branch instruction, the next frame pre-fetched is the frame which contains the target of that branch.

Figure 8:
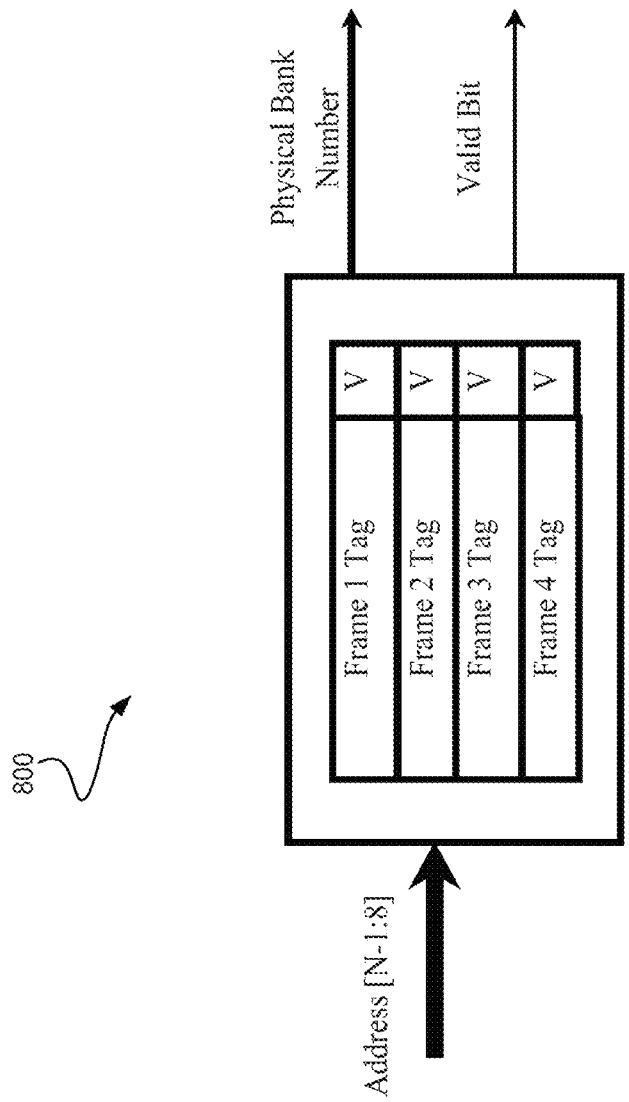
FIG. 8 depicts an exemplary CET address translation lookup table.

FIG. 8 depicts according to one embodiment, an exemplary address translation lookup table 800. The address translation as depicted in FIG. 8 includes a cache with four banks. The table 800 stores the tags of the frames cached and their corresponding valid bits. By one embodiment, each bank may store a frame including 256 entries. The address generated by the core has two components: (1) the offset within the single frame, and (2) the frame tag. When a CET cache receives a request from the core, the tag is looked up in the CET address translation lookup table. If the tag is present and the tag is valid, the physical bank number is returned. Otherwise, there is a frame fault. In this case, a request is sent to the off-chip memory controller to bring the missed frame and all CET cores stall until the frame fault is resolved.

According to one embodiment, address [N−1: 8] represents the frame tag. The instruction address is split into two fields. The first one is Address [7:0], which represents the instruction address (offset) within one frame. The remaining part of the address, namely, Address [N−1: 8] represents the frame tag. N here is the address width in bits. By one embodiment, the cache hierarchy timing model component included in the CET processor stores only the data required for performance evaluation such as coherence states and tags and the data required for cache replacement policy. Table III below depicts the content of a 2-way set associative data cache timing model by one embodiment. In Table III, the term 'Rep' corresponds to data for replacement policy e.g., counter.

Note that in the case of a cache miss, the cache controller writes the tag and the correct state of the missed cache block in any available cache line in the cache set, as if this cache block has been brought from the next lower level memory. If there are no available cache lines in that set, then the replacement policy is applied to choose a victim cache block and replace it. The replacement usually incurs a coherence transaction to inform other cores about this action. In this case, a cache coherence transaction is issued and delivered to the router to broadcast it.

TABLE III

| Data Cache Timing Model Contents. | | | | | | |
|---|---|---|---|---|---|---|
| Set 0 | State 0 | Tag 0 | Rep. 0 | State 1 | Tag 1 | Rep. 1 |
| Set 1 | State 0 | Tag 0 | Rep. 0 | State 1 | Tag 1 | Rep. 1 |
| Set 2 | State 0 | Tag 0 | Rep. 0 | State 1 | Tag 1 | Rep. 1 |
| Set 3 | State 0 | Tag 0 | Rep. 0 | State 1 | Tag 1 | Rep. 1 |

By one embodiment, the cache memory is divided into cache blocks or cache lines. One of cache memory organizations is set-associative in which multiple cache blocks are grouped into one set. Thus, a set is a group of cache blocks. In this organization, the memory address is split into three fields, (1) offset within the same cache block, (2) set index that tells which set contains the requested block, and (3) cache block tag.

Further, regarding the cache replacement policy, when a cache block is mapped to a certain set that all of its cache lines are occupied, then one of the cache blocks in this set has to be evicted, i.e., replaced by the new cache block. There are multiple cache replacement policies, such as, least-frequently used that evicts the block that is least frequently accessed, random replacement policy that evicts a block randomly, and least-recently used that evicts the block that is least recently used.

According to one embodiment, a router module (described later with reference to FIG. 9) is a network interface of the tile of the CET processor. The router is configured for routing coherence transaction among different tiles. The router has input and output port for each ring. In other words, there are input and output ports for coherence request, input and output ports for responses and the like. On each port, the router has a queue (e.g., a FIFO buffer). The router receives and queues the incoming messages on its input ports. Further, the router delivers each coherence transaction to the cache hierarchy of the tile. After the transaction is checked by the tile, the transaction is forwarded with the response (if any) to the router's output ports.

Figure 9:
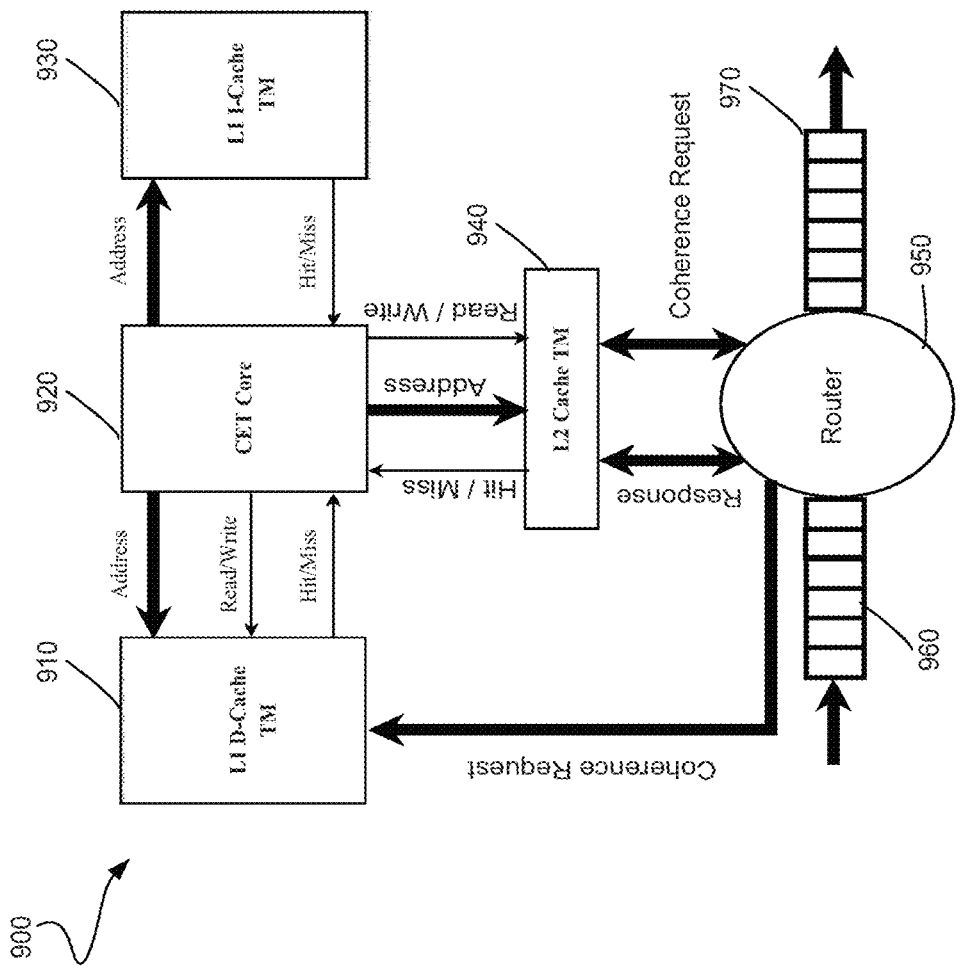
FIG. 9 depicts a block diagram illustrating interconnection of CET core, router, and cache hierarchy.

Turning now to FIG. 9 is depicted an exemplary block diagram 900 illustrating an interconnection of a CET core, a router, and caches. The interconnection as shown in FIG. 9 includes a CET core 920, a data cache 910, an instruction cache 930, a private cache (L2) 940, a router 950 which includes an input queue 960 and an output queue 970. It must be appreciated that the CET processor's tiles may be interconnected via a unidirectional ring NoC, even though the target machine may have different NoC topology. The ring topology is preferred due to its optimum hardware area consumption.

Further, before the transmission of any message over the ring, the message is stamped with a current value of the global clock (i.e. GTCC). The message takes its time to traverse over the NoC until it arrives at a certain destination tile. By one embodiment, the time at which the message is expected to arrive is calculated according to $T_a = T_s + L$, where $T_a$ is the expected arrival time according to the target NoC, $T_s$ is the timestamp at which the message was sent, and L is the expected total latency of the message from the source to the destination. Note that the parameter L is based on the target's NoC, and may be computed using an analytical model of the target NoC.

Further, the case where the parameter $T_a$ is greater than the current value of GTCC, corresponds to the case wherein the message arrives before its actual target's arrival time, and is therefore queued until the value of the global clock equals the value of $T_a$ before it is consumed by the destination. In contrast, if $T_a$ is less than the current value of GTCC, this means the message had arrived latter than it would in the target machine (i.e. the simulation speed is too high). In this case the message will not be queued and will immediately be consumed by the destination, which will also issue a slow-down request to the simulation speed controller (SSC).

The CET processor of the present disclosure supports a plurality of cache coherence protocols. Specifically, the CET processor supports both snoop-based and directory-based protocols. However, since directory-based coherence protocols are memory consuming and thereby expensive to model directly in hardware, by one embodiment, the CET processor uses snooping to model directory-based cache coherence protocols. Accordingly, every coherence transaction in a directory-based coherence protocol is broadcasted over the ring and snooped by all tiles, but the latency of the transaction is computed as if a directory exists.

Additionally, the CET core 920 in FIG. 9 provides the cache hierarchy model with the address of the data/instruction to be fetched in order to determine the result of the memory access (i.e., occurrence of a hit or a miss). For faster simulation, the CET core 920 sends the data cache request to all private cache levels simultaneously and checks their responses in parallel instead of doing that level by level sequentially.

The router 950 receives coherence transaction from the previous neighbor tile. The transaction is checked by the L2 cache controller to determine if L2 can serve it or not. In addition to that, L1 and L2 caches also check if they need to make an action according to the coherence transaction, such as: invalidating a block or changing its state from modified to shared state, and the like.

Figure 10:
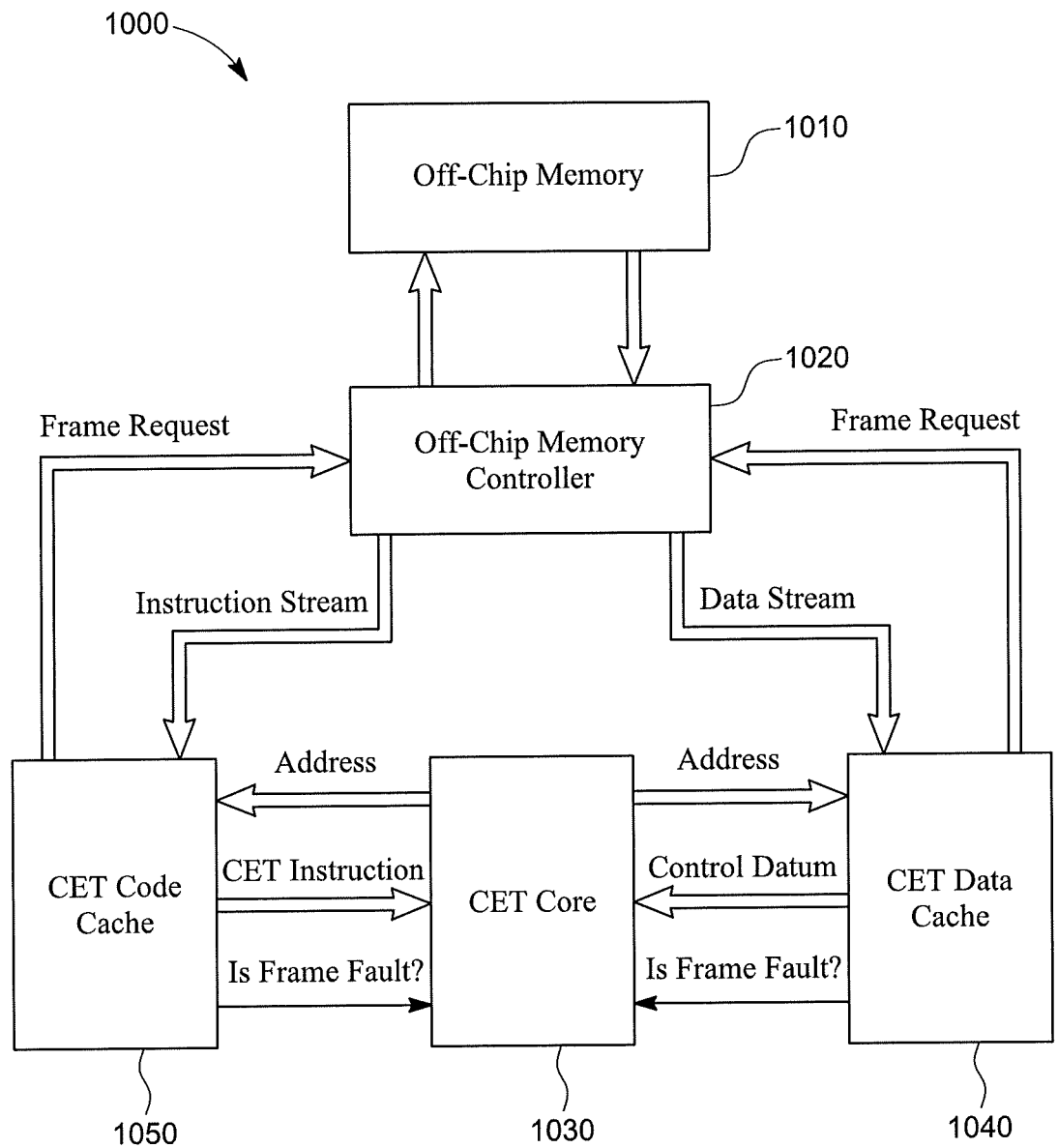
FIG. 10 depicts an exemplary system block diagram depicting interconnection of a CET core and cache with an external off-chip controller.

FIG. 10 illustrates an exemplary system block diagram 1000 depicting interconnection of a CET core and cache with an external off-chip controller. The system 1000 as depicted in FIG. 10 includes an off-chip memory controller 1020 in communication with an off-chip memory module 1010. Furthermore, the system includes a CET core 1030 that communicates with a CET code cache 1050 and a CET data cache 1040.

The CET core 1030 fetches the next CET instruction/data from the CET instruction/data caches 1040 and 1050, respectively. In operation, the CET core 1030 provides the caches (1040 and 1050) with the address of the next instruction/data that is to be fetched. A CET cache controller performs a check to determine whether the frame that includes the requested instruction/data exists. If it the frame exists, the cache controller returns the requested instruction/data to the CET core 1030. If the requested frame does not exist (a frame fault scenario) in the cache, the cache controller sets a frame fault signal.

In case of the frame fault scenario, two events may occur: (1) the cache controller forwards the request to the frame loader to obtain the missing frame from the off-chip memory 1010, and (2) All CET cores stall until the missing frame is loaded into the CET cache 1040/1050.

By one embodiment, the initial rate R by which the GTCC (module 540 described previously with reference to FIG. 5) is incremented is $$\frac{C}{n \times I},$$

where C is the number or target clock cycles required to execute I target instructions i.e. the base CPI of the target machine, and the parameter n is the minimum number of host clock cycles required to execute one CET instruction. Therefore, GTCC is incremented by C each n×I host clock cycles. It must be appreciated that the parameters C, I and n are target architecture parameters (described with reference to FIG. 1) that are specified by the user.

Furthermore, the SSC module (described previously with respect to FIG. 5) is configured to control the simulation speed by controlling the dynamic rate in which the GTCC is incremented. Specifically, the SSC keeps track of simulation slowdown requests which are issued either by one of the CET cores or a router. A CET core issues a slowdown request when its LTCC becomes greater than GTCC, while the core is not in idle state. Additionally, a router issues a slowdown request when it receives a message with an arrival time earlier than the current GTCC as explained previously with respect to FIG. 10. By one embodiment, when the SSC receives a slowdown request, it slows down the simulation speed by halving R. In contrast, when SSC doesn't receive slowdown request for a certain period of time T, it starts speeding up the simulation by doubling R. In this manner, the SSC maintains control over the simulation speed by speeding up until the first slowdown request is received, whereafter the SSC starts slowing down the simulation rate again.

Figure 11:
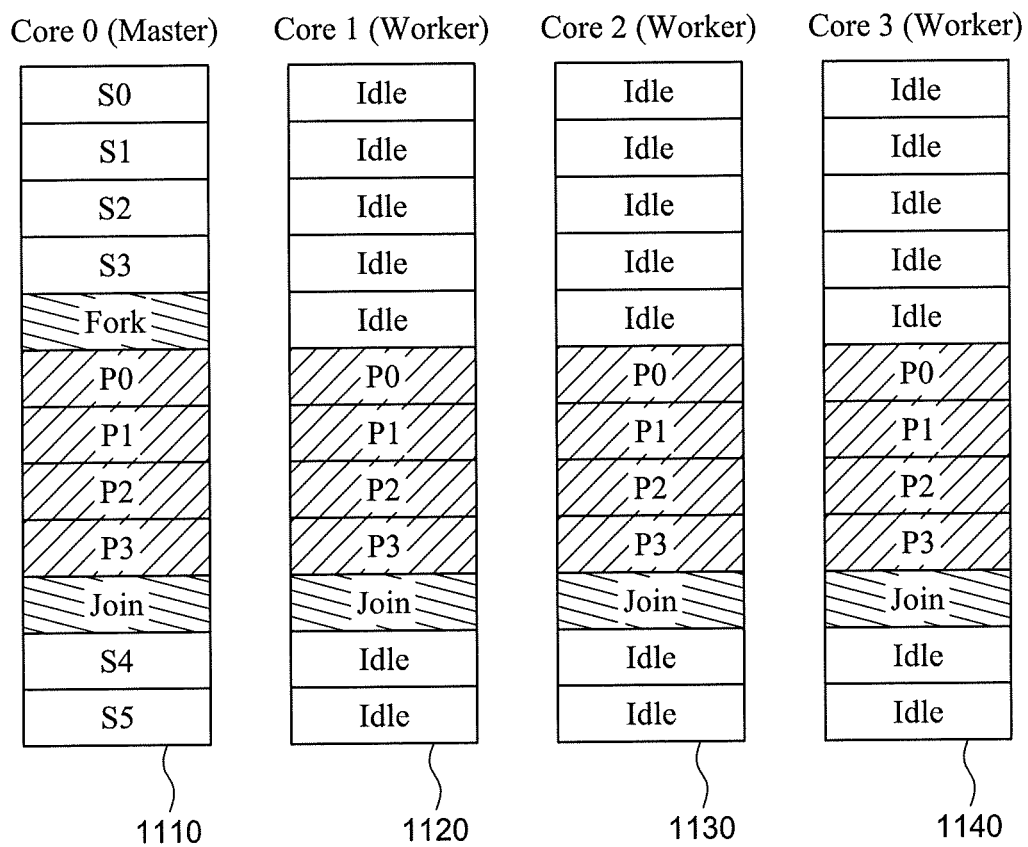
FIG. 11 illustrates a block diagram depicting parallelism management in the CET processor.

Turning now to FIG. 11, is illustrated a diagram depicting parallel processing management in the CET processor. FIG. 11 shows an illustrative image of a multithreaded application scheduling on a 4-core CET processor. Specifically, the processing performed by the master core is denoted in block 1110, whereas the processing performed by the three worker cores is depicted by blocks 1120, 1130, and 1140, respectively. In the illustration depicted in FIG. 11, the notation Si corresponds to the $i^{th}$ instruction in a sequential processing region and the notation Pi corresponds to the $i^{th}$ instruction in a parallel processing region.

Initially, the master core (block 1110) commences the master thread and the worker cores remain idle until a fork instruction is encountered by the master core. The fork instruction wakes up the idle worker cores (1120-1140). The join instruction marks the end of the parallel region and it works as a synchronization barrier for the simulation threads. When a join instruction is encountered by a worker core, it enters the idle state again and thereafter transmits a join signal to the master core. In contrast, when a join instruction is encountered by the master thread, it stops execution and waits until all worker cores join. As shown in FIG. 11, upon all the worker cores joining, the master thread resumes execution.

According to one embodiment, each of the functions of the described embodiments may be implemented by one or more processing circuits included in the CET processor. A processing circuit includes a programmed processor (for example, CET processor as describe with reference to FIG. 5), as a processor includes circuitry. A processing circuit may include devices such as an application-specific integrated circuit (ASIC) and circuit components arranged to perform the recited functions.

Additionally, the term "computer readable medium" herein refers to any non-transitory medium that participates in providing instructions to the CET processor for execution. A computer readable medium may take many forms, including but not limited to, non-volatile media or volatile media. Non-volatile media includes, for example, optical, magnetic disks, and magneto-optical disks, such as the hard disk or the removable media drive. Volatile media includes dynamic memory, such as the main memory.

While aspects of the present disclosure have been described in conjunction with the specific embodiments thereof that are proposed as examples, alternatives, modifications, and variations to the examples may be made. It should be noted that, as used in the specification and the appended claims, the singular forms "a," "an," and "the" include plural referents unless the context clearly dictates otherwise.

What is claimed is:

1. A multi-core compact executable trace device for simulating execution of an application on a many-core target machine, the device comprising:
   a processor including:
   a plurality of processing cores communicatively coupled one to another to execute a compact executable trace translated from the application;
   a global target clock counter (GTCC) configured to count a number of simulated clock cycles defining a simulation speed of the application on the target machine as simulated on the processor; and
   a simulation speed controller (SSC) configured to adjust the simulation speed based on receiving a control signal from one of the processing cores, and to dynamically adjust the simulation speed of the processor by adjusting the update rate of the GTCC; and
   a host processor communicatively coupled to the processor and configured to
   translate the application of the target machine to the compact executable trace to be executed by the processor, and
   an off-chip memory controller communicatively coupled to the processor and an off-chip memory module, configured to
   acquiring cache miss data frames and cache miss code frames from the off-chip memory module and write replacement data frames and replacement code frames back to the off-chip memory.

2. The device of claim 1, wherein the processor is configured to:
   acquire a base clock per instruction (CPI) of the target machine is acquired by simulating on a timing simulator, a benchmark of the target machine, the simulation being performed by ignoring cache miss events, the CPI corresponding to an average number of clock cycles required by the target machine to execute a single instruction; and
   set the update rate of the GTCC to an initial value that is based on the CPI and a number of host clock cycles required to execute a single instruction.

3. The device of claim 1, wherein the host processor is further configured to profile each instruction of the application to generate a profiled image of the application, the profiled image including an object for each unique instruction of the target application, and wherein each instruction of the application is mapped to a unique address in the profiled image via a hash function.

4. The device of claim 3, wherein the host processor is further configured to generate instructions from the profiled image for the processor to execute.

5. The device of claim 1, wherein a first core of the plurality of processing cores is a master core configured to execute a master thread of the application of the target machine.

6. The device of claim 5, wherein the other cores of the plurality of processing cores are worker cores configured to execute parallel portions of the application of the target machine.

7. The device of claim 6, wherein, the plurality of processing cores are arranged in a ring-network.

8. The device of claim 1, wherein each processing core of the plurality of processing cores is configured to evaluate an amount of time required by the target machine to execute an instruction.

9. The device of claim 1, wherein the processor is further configured to:
   reduce the simulation speed by half the initial value, based on the SSC receiving the control signal, and
   increase the simulation speed two-folds the initial value based on the SSC not receiving the control signal in a predetermined amount of time.

\* \* \* \* \*